T. COLWELL.
Ash Pan.
No. 80,916.
Patented Aug. 11, 1868.
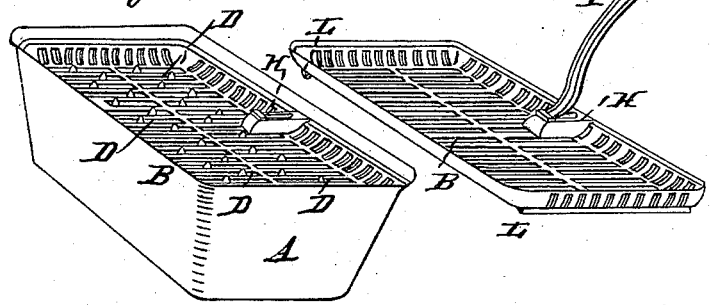
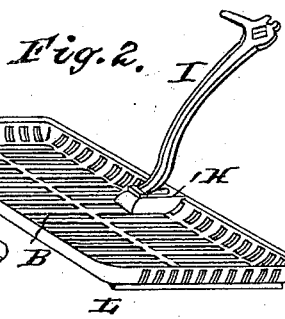
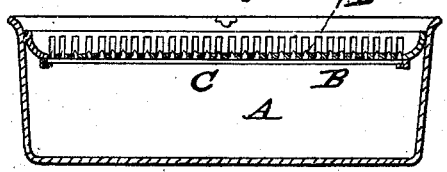
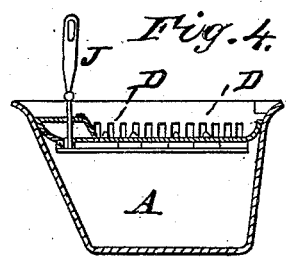
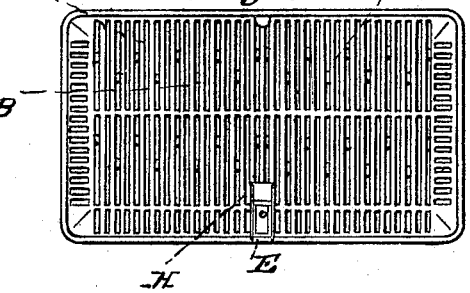
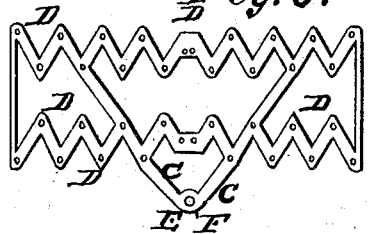
Witnesses:
Charles D Kellum
William Faby
Inventor:
Thomas Colwell

United States Patent Office.

THOMAS COLWELL, OF TROY, NEW YORK.

Letters Patent No. 80,916, dated August 11, 1868.

---

IMPROVEMENT IN COOKING-STOVES.

---

The Schedule referred to in these Letters Patent and making part of the same.

---

TO ALL WHOM IT MAY CONCERN:

Be it known that I, THOMAS COLWELL, of the city of Troy, in the county of Rensselaer, and State of New York, have invented certain new and useful Improvements in "Cooking and other Stoves;" and I do hereby declare that the following is a full, clear, and exact description of the same, reference being hereby had to the accompanying drawings, which form and make a part of this specification.

Like letters represent and refer to like or corresponding parts.

Figure 1 is a perspective view of an ash-pan drawer, containing the stationary grate B, and showing the projections or teeth D D on the rake C, hereinafter fully described and set forth.

Figure 2 is a perspective view of the grate B, detached from the rake C, and showing the mortise H, into which the handle I is placed when it is desired to remove the said grate B from the ash-pan drawer A, substantially in the manner and for the purposes hereinafter described and set forth.

Figure 3 is a longitudinal section through the ash-pan drawer A, grate B, and rake C, more clearly showing the construction and operation of the same, as hereinafter described and set forth.

Figure 4 is a cross-section through said ash-pan, grate, and rake, showing the recess or mortise H, through which the handle J passes, by means of which the rake C is vibrated, as more fully hereinafter described and set forth.

Figure 5 is a view looking down upon the ash-pan drawer, grate, and rake, and showing the hole E in the rake C, by means of which the same is vibrated, in the manner and for the purposes substantially as hereinafter specified.

Figure 6 is a top view of the rake C, showing the construction of the same, and also showing the teeth or projections D D, which project above the surface of the grate B, as shown at fig. 1, in the manner and for the purposes substantially as hereinafter described and set forth.

Figure 7 is a view of the handle J, by means of which the rake C is vibrated, substantially in the manner and for the purposes hereinafter specified.

The nature of my said invention and improvements consists in attaching to and combining with the stationary grate B, placed in the ash-pan drawer or hearth of a stove, the movable sliding rake C, which said rake C is attached to said grate B, at either the upper or under side thereof, and is vibrated horizontally by any mechanical means thought best, thereby thoroughly sifting and removing the ashes from the coal, clinkers, &c., which fall from the grate of a cooking or other stove, substantially in the manner and for the purposes hereinafter fully described and set forth.

To enable others skilled in the art to which my invention relates to make and use the same, I will here proceed to describe the construction and operation of the same, which is as follows, to wit:

The ash-pan drawer A is made of cast iron, and of the usual size and construction. The grate B is also made of cast iron, and of any form or style deemed best, and of such size as to rest upon the inclined sides of the said ash-pan drawer A, about two or three inches below the top of the same. The rake C is made in a shape and form that will the least impede the free passage of the ashes through the grate B, that shown at fig. 6 being expressly adapted for that purpose, and is fastened to the under side of the grate B by means of the cast-iron cleats L L, fig. 2, which are securely riveted to the grate B. On the surface of the said rake C are cast the teeth or projections D D, which, when the said rake is attached to the under side of said grate B, as hereinbefore described, project above the surface of the said grate B, as shown at fig. 1, to any desired distance, according to the length of said teeth or projections D D. If it is desired to fasten the rake C above the surface of the grate B, there will be no need of the teeth or projections D D, as the simple moving of the rake C horizontally over the surface of the grate B, will cause the ashes to be sifted through the said grate, and fall into the ash-pan drawer A, or hearth of the stove. If desired, the grate B and the rake C may be placed directly in the ash-pit of the stove, but it is more convenient to have the ash-pan drawer A, for in it the ashes can be more readily removed from the hearth of the stove.

The operation of my said invention and improvements is as follows, to wit: The coal-ashes, clinkers, &c., fall or are shaken from the grate of the stove upon the stationary grate B, placed in the ash-pit or ash-pan drawer A, as aforesaid. The said rake C, constructed with "zigzag" bars, as shown at fig. 6, is then vibrated, to sift the ashes, &c., by means of the handle or device J, fig. 7, which passes through an opening in the hearth-plate of the stove, and through the mortise H in the grate B, and into the opening E in the rake C, the fulcrum of the handle or lever J being at the point where it passes through the hearth of the stove, and by this means the rake C is vibrated, with the hearth of the stove entirely closed, so that no ashes can escape or dust arise from such sifting, as aforesaid. The grate B, containing the coals, clinkers, &c., is then removed by means of the handle or device I, shown at fig. 2, and by means of the same handle I, the ash-pan drawer A may be removed from the hearth of the stove, and the ashes, &c., removed from said ash-pan drawer.

I am aware that parallel bars, having teeth thereon, have been heretofore used in a vibrating rake, and at right angles with parallel bars in a stationary grate, and the same, thus constructed and arranged, have been used in the hearths of cooking-stoves.

Having thus described the nature of my said invention and improvements, what I claim as my invention, and desire to secure by Letters Patent of the United States, is—

1. The employment of the rake C, constructed and arranged with "zigzag" bars, $a$, substantially as shown at fig. 6 of accompanying drawings, in combination with the stationary grate B, and with the ash-pan or drawer A, the whole being arranged in the manner substantially as herein contained, described, and set forth.

2. The rake C, so arranged and constructed with zigzag bars, $a$, substantially as shown at fig. 6 of the accompanying drawings, and in the manner and for the purposes substantially as herein contained, described, and set forth.

3. The employment of the handle or lever J, in combination with the rake C, and with the hearth of the stove, so that the rake C may be vibrated in a horizontal plane, when used in connection with the grate B and ash-pan or drawer A, in the manner substantially as herein described and set forth.

In testimony whereof, I have hereunto set my hand, this 24th day of October, A. D. 1867.

THOMAS COLWELL.

Witnesses:
  CHARLES D. KELLUM,
  WILLIAM FAHY.